United States Patent Office 2,988,883
Patented June 20, 1961

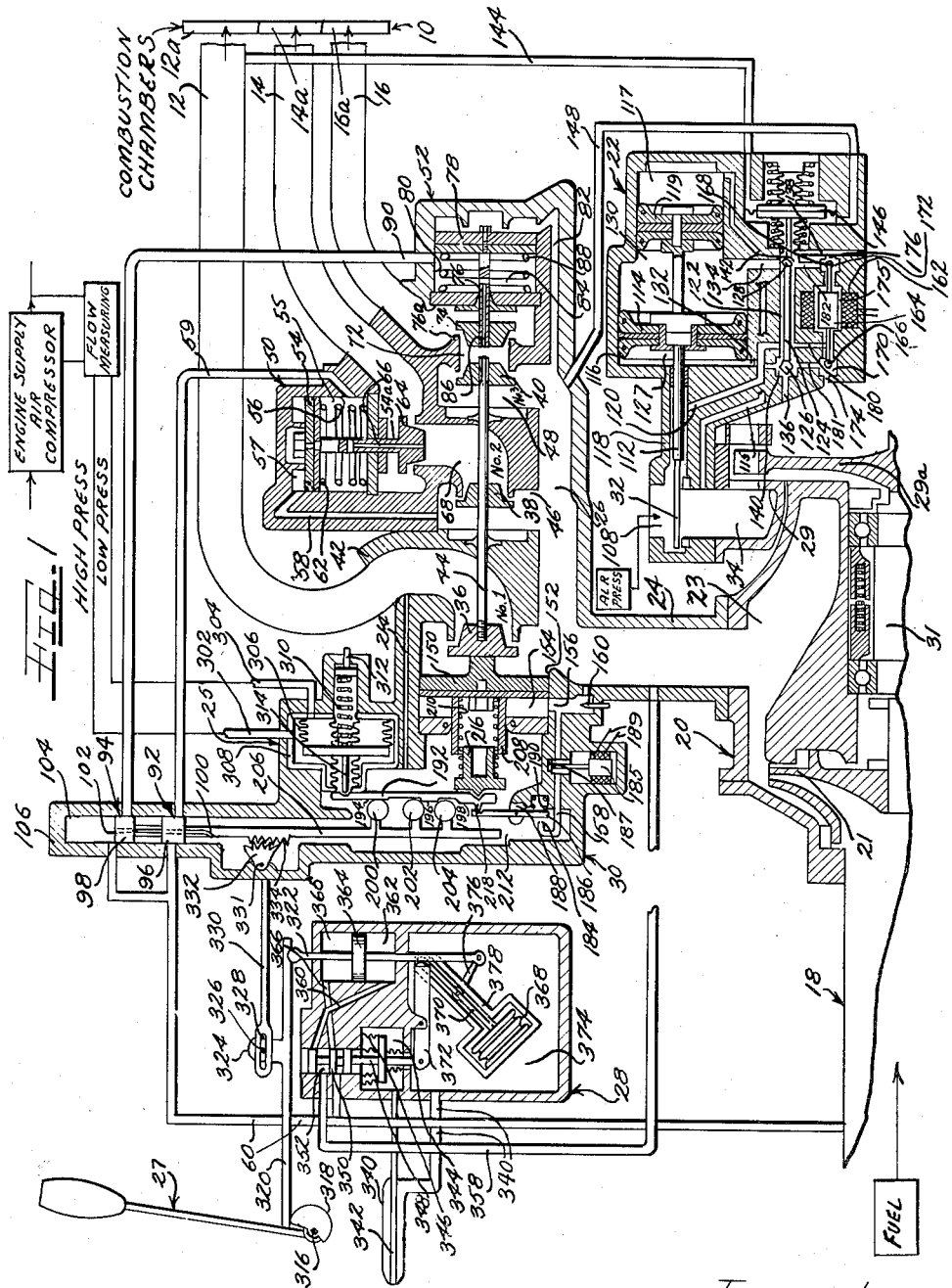

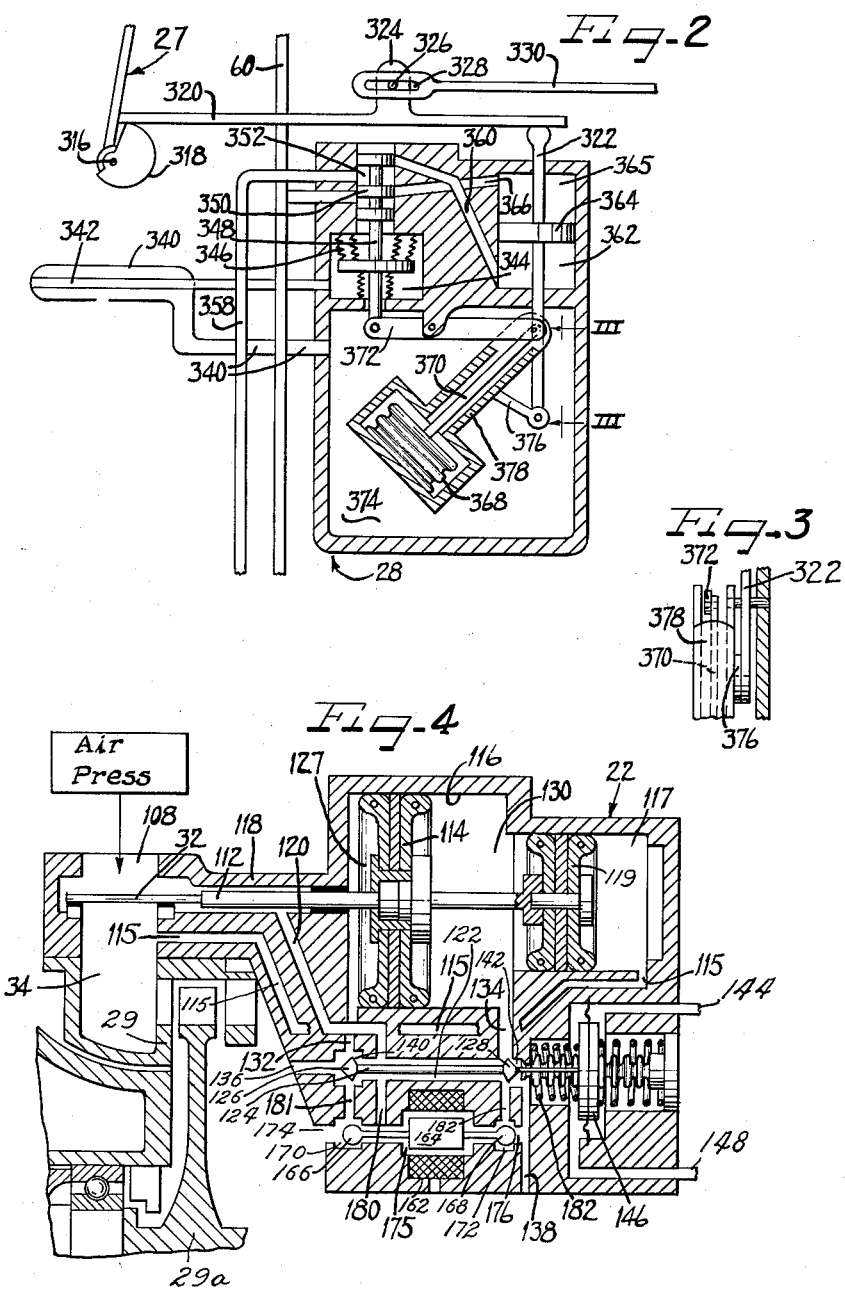

2,988,883
FUEL SUPPLY CONTROL SYSTEM FOR SUPPLYING MULTIPLE COMBUSTION ZONES IN AFTERBURNERS
Marshall J. Corbett, Mayfield Heights, Ohio, assignor to Thompson Ramo Wooldridge Inc., a corporation of Ohio
Filed Apr. 2, 1956, Ser. No. 575,624
7 Claims. (Cl. 60—39.28)

The present invention relates to improvements in mechanisms for controlling the flow of fuel to a combustion zone and more specifically to a valve control arrangement which will supply fuel to a multiple-stage afterburner and will vary the number of stages used and amount of fuel fed in accordance with the selected fuel to air ratio and in accordance with the amount of air passing through the combustion area.

In engines provided with combustion areas requiring the supply of fuel, such as turbo-jet engines having afterburners, it is sometimes necessary to use multiple combustion zones in order to provide a wide range of afterburner fuel-air ratio modulation. The demand for this wide range is caused by variances in desired fuel-air ratio and variances in the amount of air being forced through the combustion area. In the use of multiple combustion zones, it is desirable to be able to vary the number of zones and be able to accomplish this variance smoothly without seriously varying the fuel to air ratio when changing numbers of combustion zones and without affecting the operation of the afterburner. In making the transition wherein the number of combustion zones used are changed, the sensitivity of the control for selecting fuel-air ratio should ideally remain constant and the total amount of the fuel fed to the afterburner combustion area should be constant, or should decrease or increase in a smooth curve as the number of combustion areas are changed.

Further, for the maintenance of a constant fuel to air ratio with variances in the amount of air, the change between the number of the combustion areas used should be automatically and easily accomplished. Also, the change in the number of combustion areas used should be able to be accomplished smoothly by manual change in the fuel to air ratio, or by automatic change in fuel to air ratio due to a condition-responsive control.

In supplying fuel to an afterburner with a wide variance in desired fuel supply, it should be possible to accomplish the variance with one fuel flow control unit to achieve improved and more accurate control with simplicity of structure.

In accordance with the foregoing, it is an object of the present invention to provide a fuel flow control mechanism which is capable of accurately regulating the supply of fuel to the combustion area over very wide ranges of fuel demand.

It is another object of the invention to provide a fuel supply control valve mechanism which will control variances in fuel demand by controllably varying the number of combustion zones utilized.

Another object of the present invention is to provide a fuel flow control mechanism which is capable of supplying fuel to a plurality of combustion zones and changing the number of combustion zones while maintaining a uniform rate of change of fuel supply during the change in the number of zones utilized.

Another object of the invention is to provide a fuel flow control mechanism which is capable of varying the flow of fuel in response to required changes in fuel to air ratio where the requirements are obtained from a plurality of sources.

A further object of the invention is to provide a fuel metering valve arrangement which will vary the supply of fuel to a combustion zone in accordance with a combined control responsive to the amounts of air passing through the combustion zone and also responsive to a fuel to air ratio input signal.

Another object of the invention is to provide a fuel metering valve arrangement which will maintain a constant pressure differential across the metering valves regardless of amounts of fuel demand and regardless of the number of valves in use.

A still further object of the invention is to provide a fuel metering arrangement for supplying fuel to the combustion area of a multi-stage afterburner wherein the fuel supply is pressurized by an air turbine pump and the performance of the air turbine pump is not affected by the selection of different afterburner combustion zones.

Other objects and advantages will become more apparent from the following specification and claims taken in connection with the appended drawing in which:

FIGURE 1 is a schematic view of the structural arrangement of the mechanism embodying the preferred features of the invention; and, FIGURES 2, 3 and 4 are enlarged detailed views of portions of the mechanism of FIGURE 1, with FIGURE 3 being a sectional view taken substantially along line III—III of FIGURE 2.

In general, the operation of the mechanism illustrated in the drawing is to deliver metered fuel to a combustion area such as the afterburner of a turbo-jet engine. The combustion area is shown generally at 10 and is comprised of a plurality of combustion zones each of which is fed by a separate fuel distributor line, the separate fuel lines mentioned being shown at 12, 14 and 16. The lines may be connected at their discharge ends to ring manifolds or the like, not shown, which comprise the separate combustion zones and which are separately operated and separately supplied with fuel through a common supply control which will be described.

The supply of fuel which is to be metered to the afterburner area enters the control valve mechanism through a fuel line at 18 and the fuel is pressurized by an air turbine driven fuel pressure pump 20. The turbine pump which pressurizes the fuel supply is controlled by an air turbine valve shown generally at 22 in the lower right-hand corner of the drawing. This control valve automatically controls the speed of the air turbine pump to thereby control the pressure of the fuel supplied to the control valves.

The fuel is metered to the combustion zones by metering or control valves and the amount of fuel fed by these automatically controlled valves is controlled by two primary factors. These factors both function to maintain a selected fuel to air ratio. The first determining factor is the amount of air passing through the engine and flowing into the afterburner chamber. It will be apparent that this is a critical factor to maintaining the given fuel to air ratio.

The second determining factor is the selected fuel to air ratio itself and this factor is fed into the machine either manually such as by a hand control lever 27 or automatically as by a pressure ratio sensing device 28. The hand lever and pressure ratio sensing device both send a control signal to determine the position of the fuel flow valve arrangement and the signals will modulate each other to obtain the proper fuel to air ratio in the afterburner zone.

The combined signals of the manual fuel to air ratio selection lever 27, the pressure ratio sensing device 28 which determines the fuel to air ratio, and the air flow sensing mechanism 25, are joined in a modulated single valve control signal to control the apparatus shown generally at 30 for controlling the position of the fuel flow metering valves.

Each of the three described control elements and the other units will be separately described in detail in accordance with their structural relationship and functional relationship with respect to the mechanism as a whole and each section of the specification will be titled in accordance with the portion being described.

*Fuel pressurizing mechanisms*

The afterburner or combustion fuel is supplied through a pump inlet pipe 18 leading to the air turbine afterburner fuel pressure pump 20. The fuel enters the inlet of the pump and passes through the impeller 21 to leave the pump through the outlet pipe 24 in a pressurized condition.

After leaving the impeller vanes 21, the fuel passes through the diffuser section 23 of the pump and hence upwardly as shown in the drawing, to the outlet pipe 24 which leads to the manifold chamber 26 feeding to the inlets of the separate fuel flow control valves.

The fuel pump is driven by an air turbine 29 having blades shown at 29a mounted on the shaft 31 on which is also mounted the impeller 21 of the fuel pump. Presurized air, which is supplied from the compressor of the main turbo-jet engine enters the fuel pump air turbine through the chamber 34 and the amount or pressure of the air entering this chamber is controlled by a gate valve 32. The gate valve is operated by the air turbine pump control valve 22 in a manner which will be later described in detail. In any event, the air which enters the air turbine controls the speed of the fuel pump and hence controls the pressure of the fuel which is discharged from the pump 20 into the line 24 and to the valves through the manifold 26.

The position of the gate valve 32 and speed of the air turbine pump is regulated by the control valve 22 in order that the fuel will have a constant pressure differential across the control valves and this pressure differential can be controlled by regulating the pressure of the fuel as it enters the valves in the manifold 26.

*Fuel flow control valves*

Separate and individual valves are used to control the flow of fuel to the combustion area with the separate valves being shown at 36, 38 and 40. These valves are also labelled No. 1, No. 2 and No. 3 and for convenience will be thus referred to. The valves are each provided with a seat formed in the casting 42 common to all the valves and the valves are mounted for concurrent movement on a single valve stem 44. Each of the valves is arranged on its stem so that they will be moved an equal distance from their seat and since the valves are of equal size or area the flow through each of the valves will be the same. The flow through the valves is, of course, dependent on the valve area which is the same and also on the pressure drop across the valve, and as will be seen from the later description, this pressure drop is kept uniform for each of the valves.

Connected between the outlet side of each of the valves and a combustion zone in the afterburner is a distributor line, the lines being shown at 12, 14 and 16. Each of these distributor fuel lines leads to a separate manifold or to a separate combustion zone in the combustion area of the afterburner. With the use of multiple combustion zones, the fuel-air ratio can be varied over a very considerable range.

As was previously mentioned, in order to obtain a predetermined flow across the valve No. 1 for a given opening in the valve, the pressure drop across the valve and hence the fuel flow for a given opening is maintained constant by control of the pressure of the fuel as it is pumped to the valves. Each of the succeeding valves No. 2 and No. 3, has its own pressure regulator which measures the pressure head across the valve and reduces the discharge pressure if necessary to maintain a substantially uniform pressure in each of the three distributor lines. It will, of course, be seen that if a certain ratio of pressure as between each of the distributor lines is desired, this can be obtained by selecting pressure regulators for the separate valves each of which will obtain a different pressure in the distributor line.

Thus when all three of the valves are feeding fuel to the afterburner combustion area, the fuel passing through valve No. 1 leaves the manifold 26 entering through the valve inlet 44, the fuel for valve No. 2 leaves the manifold 26 entering through the valve inlet 46, and the fuel for valve No. 3 leaves the manifold 26 entering through the valve inlet 48. The pressure regulating valve for valve No. 2 is shown at 50 and the pressure regulating valve for valve No. 3 is shown at 52.

The regulating valve 50 for valve No. 2 has a piston 54 slidably contained within a cylinder 56. A fuel pressure line 58 leads from the inlet side 46 of valve No. 2 to the cylinder 56 on the back or high pressure side 57 of the piston 54. The cylinder on the low pressure side or the rod side 55 of the piston is vented through line 59 which connects through valve 94 to the drain line 60 which leads to the fuel inlet line 18. The fuel inlet line 18 and drain line 60 are at a reduced pressure and for purposes of discussion may be assumed to be somewhere near atmospheric pressure. The pressure differential between the high pressure end 57 of the cylinder 56 which is at a pressure greater than atmospheric pressure and the low pressure end 55 is offset by a coiled compression spring 62 within the cylinder. The position of the piston 54 controls the position of a pressure regulator valve 64 which moves toward or away from the seat 66 in the casting 42.

The pressure regulator valve 64 also acts as a shut-off valve and this operation will appear later. In order that the valve 64 will be affected by the pressure of the fuel on the low pressure side of the valve No. 2 as well as on the high pressure side, the low pressure fuel is bled into the low pressure side of the regulating valve control piston 54. Through the center of the valve 64 and the stem or piston rod 54a which supports the valve from the piston 54, is a bleeder line 66 bleeding fuel from the output side 68 of the fuel control valve No. 2. The low pressure end 55 of the cylinder communicates with the vent line 59 but this is normally sealed by valve 92. Thus, in operation as a pressure regulator valve, the piston is pressurized on one side by the high pressure fuel and on the other side by the low pressure of the fuel bleeding through the line 66. The high pressure side is counterbalanced by the spring 62 and the piston thus moves back and forth to control the pressure in the distributor line 14 leading from the pressure-regulating valve 64.

A similar arrangement for regulating the pressure drop to the discharge side 72 of the flow valve No. 3 is provided in the pressure-regulating valve 52. The pressure-regulator 52 carries a valve body 74 which moves against a seat 76a to regulate pressure drop of the fuel passing through the flow valve No. 3. The valve body is carried on the piston rod 76 carried by a piston 78 movable in a cylinder 80. The high pressure side of the piston is subjected to high pressure fuel through a line 82 and the low pressure side 84 of the piston is subjected to low pressure fuel which is bled through a bleeder line 86 extending through the center of the valve 74 and the piston rod 76. A coiled compression spring 88 on the low pressure side counterbalances the pressure on the high pressure side of the piston and causes the piston to operate as a fluid pressure-regulator to move the valve 74 toward and away from its seat 76. Thus, for a given opening of the fuel flow valve No. 3 the pressure in the distributor line 16 will remain constant being controlled by the pressure-regulator valve 52. As is the case with the pressure-regulator valve 50, the valve 52 may also be operated as a shut-off valve for the distributor line 16 in a manner which will later be described.

The low pressure side 80 of the piston 78 communicates with line 90 which joins the drain line 60 leading back to the fuel supply line 18 but this normally is sealed off by the valve 94.

Each of the vent lines 58 and 90, before joining the drain line 60 pass through valves 92 and 94, respectively, the valve members 92 and 94 are shown in the form of cylindrical sliding valves each having a sliding body member 96 and 98 connected to a common stem 100. The stem 100 is cored with a pressure relief line 102 which prevents pressure from building up in the end chamber 104 of the valve body 106. The valve stem 100 is connected to a master fulcrum control rod 206 which functions to determine the setting and the degree of control of the fuel flow control valves in a manner that will be later described.

The fluid pressure-regulator valves 50 and 52 are individually closable to stop the flow through the distributor lines 14 and 16, respectively. To accomplish this, the vent lines 90 or 59 are normally shut off but the valves 96 and 98 are selectively openable with the axial movement of the valve-carrying stem 100. As the stem is moved downwardly as shown in the drawing, the vent line 90 is first connected to the drain 60 to relieve pressure from beneath the piston 78 of the regulator valve 52. This causes the piston 78 to move to the left, as shown on the drawing, and snaps the valve head 72 against the seat 76 to thereby close the valve. This immediately stops the flow of fuel through the distributor line 16 and fuel now is supplied to the combustion area only through the lines 12 and 14. At this same time, the valve stem 44 carrying valves Nos. 1, 2 and 3 is moved to the left immediately opening the two remaining operative valves No. 1 and No. 2 an additional amount to increase the flow through lines 12 and 14 to compensate for the loss of fuel flow in line 16. Thus, when any of the combustion zones are cut out, there is immediately an increase of fuel feed to the remaining combustion zones to cause a smooth transition and an even flow of power as the number of combustion zones in use is changed.

As the combustion zone selector valve stem 100 is moved further downwardly, as shown in the drawing, the line 59 is next vented and connected to the drain line 60 thus closing the valve 64. By venting line 59, the pressure in the chamber 56 beneath the piston 54 is suddenly reduced and the piston moves downwardly, as shown in the drawing, to move the valve 64 against its seat 70. This immediately terminates the flow through the distributor line 14 and after this time only the distributor line 12 will be feeding fuel to the afterburner combustion zone. The closing of the pressure-regulator valve 64, which is on the discharge side of fuel flow control valve No. 2, is accompanied by a sudden shift to the left of the valve stem 44 to open valve No. 1 further and compensate for the reduction of flow in fuel to the combustion area by the stopping of the line 14. It will be recognized that although valves Nos. 1, 2 and 3 are all mounted on the same stem 44, the movement of the remaining valves is not important since their discharge sides have been cut off by the closing of the pressure-regulating valves 50 and 52.

The mechanism for automatically moving the valve stem 44 and opening the fuel flow control valves to compensate for cutting off the distributor lines will be later described in detail.

As has been previously described, the flow control valves automatically open to give a greater flow for the valves which remain effective. The reverse is true when the control valves 50 and 52 are again opened. For each opening the control valves will immediately and automatically move toward a more closed position to keep the total flow of fuel to the total combustion area at a constant rate of decrease or increase.

*Mechanism for controlling fuel supply pressure*

At 22, in the drawing, is illustrated the air turbine pump control valve. This valve contains a pressure-sensitive mechanism which is connected between the pressurized fuel supply and the distributor line 12. The valve measures the pressure head differential which is the equivalent of the drop in pressure across the valve No. 1 and maintains this pressure drop at a constant. This is accomplished by the valve 22 varying the speed of the air turbine pump 20 to thereby vary the fuel pressure supply in the pipe 24 and the valve manifold 26.

The speed of the air turbine pump 28 is controlled by the pressure of the air in the air supply chamber 34. This pressurized air is obtained from the compressor of the turbo-jet engine, and is supplied through a conduit 108 leading to the pressure system. The pressure for operating the air turbine pump 29 is controlled by a gate valve 32 carried on the end of a gate valve control rod 112. The gate valve control rod 112 connects to a piston 114 slidably mounted within a cylinder 116. The position of the gate valve control piston 114 is controlled by the pressures in the chambers within the cylinder 116 on each side of the piston 114.

The pressure for operating the piston 114 is obtained from the main air pressure line 108 which furnishes air to rotate the air turbine. Air from the pressure line 108 is led along the valve control rod 112 which is loosely fitted within the casting 118 and down through an air line 120 in the casting 118. The line 120 leads down to a pressure chamber 122 through which passes a valve rod 124 carrying valve heads 126 and 128 on each end. At the ends of the pressure chamber 122 are the valve chambers 140 and 142 in which the valve heads move. Air is fed to each end of the piston 114 by piston control lines 132 and 134 which lead upwardly to each side of the piston from the pressure chamber 122. The valve stem 124 is shown in the drawing with the valve heads 126 and 128 in the neutral or stable position wherein no movement of the speed control piston 114 will result. In the stable position, the air leaks from the pressure chamber 122 past each valve 126 and 128 at an equal rate and thus the pressures in the chambers 127 and 130 on each side of the control piston 114 will be equal and no movement of the piston will occur.

The piston control air lines 132 and 134 are vented around the heads 126 and 128 of the valves through the valve chambers 140 and 142 to the atmosphere with the line 136 leading to atmosphere from the valve chamber 140 and the line 138 leading to atmosphere from the valve chamber 142. These lines to atmosphere permit a small amount of pressurized air to bleed around the valve heads. If the valve stem 124 moves to the left, for example, the valve head 126 will seat on the left-hand end of the valve chamber 140 and the valve head 128 will seat in the left end of the valve chamber 142. The valve 126 will thus shut off the line 136 which leads to atmosphere and this will cause a build up of air pressure in the valve chamber 140 and also in the chamber 127 to the left of the piston 114. Simultaneously, the valve head 126 will seat on the left-hand side of the valve chamber 142 permitting the air from the right-hand side 130 of the piston 114 to bleed rapidly out through line 134 and be vented to atmosphere through line 138. This will cause a rapid movement of the piston 114 to the right, as shown in the drawing, thus increasing the opening of the gate valve 32 and admitting more air to the chamber 34 to speed up the operation of the air turbine pump 29. This, of course, will increase the fuel pressure in the manifold 26. The increase in fuel pressure, of course, will have been made in response to a decrease in pressure differential across valve No. 1. This decrease in pressure differential is caused either by a drop in pressure in the distributor line 12, as might be caused by an increased opening of the valve No. 1, or a decrease in fuel pressure on the inlet side of the valve.

Stability of the piston 114 is obtained by feeding back turbine air inlet pressure through line 115 to chamber 117 acting on a small plunger 119 connected to piston 114.

The distributor line 12 connects to the air turbine pump control valve 22 through a line 144 which leads to one side of a diaphragm 146. The fuel pressure supply is led to the air turbine pump control valve by a pressure diaphragm line 148 which leads to the other side of the diaphragm 146.

On the drawing it will be noted that if the pressure in the fuel manifold 26 drops too low or the pressure differential across valve No. 1 is too low the diaphragm 146 will move to the left thus causing the valve control stem 124, which is rigidly connected to the diaphragm 146, to move to the left as has been previously explained thereby causing the piston 114 to move to the right opening the gate valve 32 and speeding up the air turbine pump. This will have the effect of increasing the pressure in the fuel pressure supply line 24 correcting the situation which existed.

If the diaphragm 146 is moved to the right due to too large a pressure drop across the valve 1 the pressure in the pressure fuel supply line 24 must be dropped. The diaphragm 146 moving to the right will cause the valve heads 126 and 128 to seat at the right of their individual valve chambers 140 and 142 thereby venting the left side 128 of the piston and pressurizing the right side 130 causing the piston 114 to move to the left and close the gate valve 32. This slows down the air turbine pump and reduces the pressure in the fuel pressure supply manifold 26.

Means are provided to manually regulate the speed of the air turbine pump or to terminate operation of the mechanism. The manual control is provided through a solenoid-type regulator shown at 162. The plunger core of the solenoid 164 is carried within coils provided with electricity through leads leading to a suitable manual control switch, not shown, which may be set by the operator. The solenoid plunger carries at its ends valves 166 and 168 each of which operates in a valve chamber 170 and 172 respectively. The valve chambers each have vent passageways 174 and 176 with the passageway 174 venting directly to atmosphere and with the passageway 176 leading to the atmosphere vent passageway 138. The plunger 164 is carried in a pressure chamber 175 which is supplied with pressure through line 180 which connects to the pressure chamber 122. The pressure chamber 175 connects to the ends of the cylinder 116 in which the valve control piston slides, by lines 181 and 182 leading to lines 132 and 134.

The solenoid plunger 164 is normally maintained in the central neutral position so that the valve members 166 and 168 will not affect the piston 114 or upper valve members 126 and 128. When manual control is to be effected, however, the solenoid is moved either to the right or to the left causing the valve members 166 and 168 to either bleed air from one side of the piston and admit pressurized air to the other side or vice versa.

Thus it will be seen that the air turbine pump control valve 22 automatically controls the speed of the air turbine pump to maintain fuel pressure in the pressure fuel supply line 24 and in the manifold 26 so that a constant pressure drop will occur across the valve No. 1. The pressure drop across valves 2 and 3 is also maintained constant by their individual pressure regulator valves 50 and 52. Thus a uniform pressure will be supplied to the combustion area in the afterburner by each of the distributor lines 12, 14 and 16 leading to the individual combustion zones.

*Fuel flow valve position control mechanism*

The position of the fuel flow regulating valves Nos. 1, 2 and 3 is controlled by valve control piston 150 which is secured to the head end of the valve 1 and is, of course, interconnected to valves 2 and 3 through the stem 44. The piston 150 is pressure-responsive and slides in a cylinder 152. The cylinder 152 to the right of the piston 150 is subjected to the pressurized fuel supply, being open to the fuel supply manifold 26. The left side of the piston 150 is subjected to reduced fuel pressure which is fed into the chamber 154 behind the piston through a reduced pressure port 156. The fuel in this port is of reduced pressure, being bled off from the port 156 through bleeder line 158. Line 158 if opened at the end 184 will reduce the pressure in the port 156 and thus reducing the pressure in the chamber 154 behind the piston causing the piston to move to the left to carry the control valves 1, 2 and 3 to the left thus opening them. A needle valve 160 may be conveniently supplied to control the amount of fuel feed into the port 156. The pressure behind the valve control piston 150 is thus controlled by the amount of fuel bled through bleeder line 158 which is controlled by its end opening at 184.

The pressure in the chamber 154 behind the valve position control piston 150 is thus controlled by the amount of fuel that is bled from the opening 184 of the bleeder line 158. The opening 184 is controlled by the pivotal valve member 186 shown in the form of a rocker arm pivoted on a bracket 188. A coil compression spring 190 urges the rocker arm toward closed position against the opening 184 and the action of this spring is resisted at the other end of the rocker arm 186 by a lever arm 192, which controls the position of the rocker arm and hence the opening 184 and the position of control piston 150 and the fuel flow valves.

The lever arm 192 is unique in construction and has a series of three fulcrum points 194, 196 and 198. These fulcrum points selectively rest on fulcrum wheels 200, 202 and 204. The fulcrum wheels are carried on the master fulcrum control rod 206 which is connected at its upper end to the valve stem 100 which was previously described. The lever 192 is thus pivoted about the fulcrum wheel which engages its fulcrum point to pivot the rocker arm 186 to determine in the amount of opening given to the opening 184 and thus determine the amount of fuel that will be bled to reduce the pressure of the chamber 154 behind the valve control piston 150. The fuel which escapes from the bleeder line opening 184 passes into the chamber 212 where it is fed back through a line 214 to the distributor line 12.

The flow valves can be normally controlled through a solenoid 185. The solenoid carries a valve 187 which, when the solenoid is energized, closes the bleeder line 158 to permit the fuel pressure to build up behind the control piston 150 and move the piston to the right to close the valves No. 1, 2 and 3. The solenoid is controlled by an operator's switch (not shown) connected to electrical leads 189 and used to shut off the afterburner completely by closing the flow control valves.

The controlled position of the fuel flow valves is also fed into the control system. To feed back the valve position, the valve control piston carries a hollow cylindrical boss 208 in which is carried a coil compression spring 210. The outer surface of the cylindrical boss projects through a circular opening in the cylinder which contains the piston 150 and is sealed so that the fuel pressure within the piston will not escape.

The spring 210 within the hollow boss 208 carries at its outer end a plug 216 having a point 218 that engages the lever arm 192. Thus as the valves 1, 2 and 3 are moved to the left in the drawing they push to the left on the spring 210 which pushes outwardly on the plug 216 to move the lever arm to the left. This tends to pivot the rocker arm 186 in a counter-clockwise direction as illustrated in the drawing opening the opening 184 of the bleeder line further to reduce the pressure in the chamber 154. Thus only part of the control signal comes from the pivotal position of the lever arm 192, the rest coming from the valves themselves.

Air flow responsive mechanism

In order to maintain the desired air to fuel flow ratio the control mechanism must be varied as the air supply varies. The air supplied to the engine and to the afterburner section may be measured by a mechanism which is sensitive to the pressure differential or pressure rise through the compressor. Thus, as is illustrated generally at 25, the pressure sensitive mechanism has a first line 302 which connects to the high pressure side of the engine compressor and a second line 304 which connects to the low pressure side. As will be appreciated by those skilled in the art, a compressor is employed, as labeled in FIGURE 1, wherein the quantity of air delivered is a function of pressure rise through the compressor; as will further be recognized, a flow measuring device may be employed in the line from the compressor which measures flow in terms of pressure drop through the line. Line 302 may be considered to be connected to the high pressure side of the flow measuring device and line 304 to the low pressure side.

The low pressure line 304 leads to the inside of bellows 306 and the high pressure line 302 leads to the chamber outside of the bellows as enclosed by the casting 308. Within the bellows is a pressure compensating spring 310 with a spring tension regulator 312. Connected to the bellows and movable therewith is a lever arm operation projection 314 which engages a notch in the lever arm 192.

Thus, for example, as the bellows compresses indicating an increased flow of air, the lever arm will be pivoted in a clockwise direction as is shown in the drawing to pivot the rocker arm 186 in a counterclockwise direction, thus increasing the flow of fuel through the bleeder line 158 and moving the valve control piston 150 to the left to increase the opening of the fuel control valves 1, 2 and 3. This will increase the fuel flow and automatically maintain the proper fuel to air ratio. A reduction in flow of air will have an opposite effect to that previously described and will decrease the flow of fuel by closing the fuel flow control valves.

Mechanism for selecting fuel to air ratio

The fuel to air ratio may be manually increased or decreased by manipulating the hand lever 27 and this hand lever may be controlled to either obtain a desired fuel to air ratio or, if the engine is used in aircraft, to obtain a selected flight Mach number. The hand lever 27 is pivotally supported at its base at 316 and carries a cam 318 which supports a modulating arm 320. This modulating arm is connected at its base end to a piston rod 322 which reciprocates in response to the action of the pressure ratio sensing device 28 to also control the fuel to air ratio. The modulating arm has a boss 324 at its center carrying a pin 326 slidably mounted in a slot 328 in a rack-operating arm 330. The rack-operating arm is pivotally mounted on the shell 300 and is secured to a shaft 331 driving a segment gear 332 which is in mesh with a rack 334 carried on the master fulcrum control rod 206. Thus, as is illustrated, pivotal movement of the pinion 332 will be caused by pivotal movement of the arm 330 and will shift the master fulcrum control rod 206 up or down as is illustrated in the drawing.

Pivotal movement of the arm 330, as will be recognized, can be obtained by moving the manual arm 27 to pivot the cam 318 thus raising the modulating arm 320. The modulating arm, of course, can also be raised or lowered by the piston rod 322 which supplies the output of the pressure ratio sensing device 28.

As the master fulcrum control rod shifts axially, it performs two functions. First it moves the fuel manifold selector pilot valves 96 and 98 to either stop or start the flow of fuel individually through the distributor lines 14 and 16, as will be determined by the position of the pressure regulator valves 64 and 74. The axial shifting movement of the master fulcrum control rod 206 also selects which of the fulcrum rollers 200, 202 and 204 will act as a fulcrum for the lever arm 192.

In the position illustrated in the drawings, the roller 200 bears against the point 194 of the lever arm 192 and thus the arm pivots about that point. Thus, when the lever arm 192 is pivoted by the movement of the air flow sensor mechanism 25 operating by means of the pin 314 contacting one end of the lever arm, a fairly extensive movement of the opposite end of the lever arm will be obtained; since the ratio of length from the lower end of the lever arm to the fulcrum roller 200 to the length of the lever arm from the fulcrum roller 200 to the upper end is fairly large. As the master control fulcrum rod 206, however, is shifted axially downwardly, the fulcrum roller 200 will leave the point 194 and the fulcrum 202 will move on top of the point 196. This changes the position of the effective fulcrum for the lever 192 and the response to the lower end of the lever arm will not be as swift as it was when the roller 200 was acting as the fulcrum. Neither will the movement of the lower end be as extensive.

When the master fulcrum control rod 206 shifts even further downwardly, the roller 204 will become the fulcrum and thus the amount and speed of response of the lower end of the lever arm 192 will be greatly decreased for a given movement of the upper end. Three fulcrums 200, 202 and 204 are chosen to individually act with three raised points 194, 196 and 198 on the lever arm because there are three fluid flow control valves in operation. Each time a fluid flow control valve is taken out of operation for closing a regulator-shutoff valve 64 or 74, a different pivotal point for the fulcrum must become effective. This will automatically smooth the operation of the afterburner and the power output as the number of combustion zones are reduced.

Thus, as the master fulcrum control rod is shifted axially downwardly, as shown in the drawing, the fulcrum 200 ceases to be effective and the fulcrum roller 202 takes over at the exact point where the shutoff valve 74, which is positioned at the output of control valve No. 3, is closed. This, as it will be recalled, is closed by the valve 98 opening the vent line 90 to the drain line 60. Up to the point of the closure of the shutoff valve 74, the amount of fuel fed to the combustion area will have been gradually reduced, with the fluid flow control valves 1, 2 and 3 moving toward their closed position. When a different operating range or, in other words, a different fuel to air ratio is to be selected, one or more of the combustion zones may be cut out by closing off the distributor lines. Moving the master fulcrum control rod 206 axially will first shut off the flow in the line 16 and next shut off the flow in the distributor line 14 by successively closing the valves 74 and 64. The moving of the master fulcrum control rod will simultaneously shift the fulcrum for the lever arm 192 from the roller 200 to the roller 202 to the roller 204, the latter roller constituting the fulcrum when only the fuel control valve No. 1 is operative.

The shifting of these fulcrums performs two functions. First, the lands or the points 194, 196 and 198 on the fulcrum rod are of different height. Therefore, as the fulcrum is changed from the roller 200 to the roller 202, the lever 192 is shifted bodily to the left to open the fuel flow control valves in a definite step. This shifting compensates for the closing of the distributor line and maintains the valve area supplying the total combustion area the same as before the distributor line was shut off. The same effect is true when the second line is shut off by closing the valve 64. The fulcrum moves to the roller 204 moving the fulcrum lever 192 bodily to the left to open valve No. 1 an additional amount to maintain the flow of fuel to the combustion area substantially the same as before the valve 64 was closed. This creates a smooth transition of power when the number of burner zones is changed.

The second effect of changing the fulcrum with axial movement of the master fulcrum control rod 206, is to change the ratio of the length of lever arm between the fulcrum and the controlled point and the fulcrum and the controlling point. Thus, when the fulcrum 200 is used, the ratio of movement between the lower end of the lever arm 192 and the upper end is fairly large but when the fulcrum 204 is used, the ratio is fairly small.

For example, if the diameters of the fuel valves Nos. 1, 2 and 3 are in the ratio of 6 is to 3 is to 1, it will be necessary for the valve stem supporting the fuel control valves to move with half the stroke control when valves No. 1 and No. 2 are in operation as it did when only valve No. 1 was in operation, if the rate of control change is to remain constant. If the transition is then made to valve No. 1 plus No. 2 plus No. 3, it will be necessary to have the valve stem move only one-third the stroke that it had when operating valves No. 1 and No. 2 together. Therefore, the lever arm ratios covered by the lands or points on the lever arm provides these proportional changes in the movement of the valve stem so that the total valve area open will remain the same as changes in the number of burner zones chosen to be in operation are made. In actual practice it will be necessary to supplement the simple linkage shown which is operated by the manual lever 27 with some kind of integrating device to avoid the hunting, off-on operation of the afterburner right at the selected flight Mach number or the selected fuel to air ratio.

*Pressure ratio sensing device*

Although the mechanism shown at 28 does not form a part of the present invention, but merely contributes to aid in the determination of the selected fuel to air ratio from a further factor such as air density, a brief description will be useful. The mechanism shown generally at 38 has a static pressure tube 340 and a pilot pressure tube 342 which projects into a selected air stream. The pressure in the inner tube 342 is conducted into a sealed chamber 344 which houses a bellows 346. The bellows 346 is subjected to the force applied by the pressure differential of the air pressure 340 within the chamber and a vacuum within the bellows and movement of the bellows is transmitted to a valve stem 348 carrying cylindrical slide valves 350 and 352. The valve 350 when displaced axially downward, as shown in the drawing, opens the piston chamber 365 to the drain pressure line 360 and the piston chamber 362 to the fuel pressure line 358. The cylindrical valve 352 when displaced axially upward opens the piston chamber 362 to the fuel pressure line 358 and chamber 363 to the drain line 60. The piston 364 is connected to the piston rod 322 which is connected to the modulating arm 320 and thereby controls the fuel to air ratio through the control mechanism previously described.

The movement of the valve 350 must move the beam 372 which is connected to the valve stem 348. The beam is connected at the other end to the bellows 346 within the chamber 344.

The line of force of the valve stem 348 operated by the bellows 346 is at right angles to the beam 372, whereas the line of force of the rod 370 connected to the bellows 368 is at an angle. The effective resistance of the bellows 368, the expansion of which is controlled by the static air in the chamber 374, is proportional to the function of the angle that the rod 370 makes with the beam 372. This angle is controlled by the piston 364. The piston rod 322 is connected to an arm 376 secured to the pivotally movable frame 378 supporting the bellows 368.

Thus, the pressure differential between the static pressure and ram pressure within the tube 342 will determine the angular position of the support 378 for the bellows. This acts as a follow-up system to determine the position of piston 364 in accordance with the pressure differential of the pitot tube and static pressure. The position of the piston 364, of course, will control the fuel to air ratio by its action on the modulating arm 320.

Although the operation of the mechanism as a whole will be clear from the description of the various elements, a summary of operation will be helpful in appreciating the features of the invention.

Fuel enters through the line 18 to be pressurized by the air turbine fuel pump 20 and the fuel pressure supply line 24 distributes fuel to the manifold 26. Fuel is fed through fuel control valves 36, 38 and 40 to distributor lines 12, 14 and 16 which lead to combustion zones in the main afterburner combustion area.

The pressure drop across valve No. 1 is maintained constant by an air turbine pump control valve shown at 22. To accomplish this, a diaphragm 146 having lines 148 and 144 leading to the fuel pressure supply and the distributor line 12, respectively, controls the operation of the control valve 22. The control valve controls a gate valve 32 which supplies air through a chamber 34 to the air turbine 28. As the pressure differential across valve No. 1 is reduced, the diaphragm 146 moves to the left to move the valve stem 124 to the left and the valve heads 126 and 128 to the left. This bleeds air from the chamber 130 to the right of the piston and feeds air to the left of the piston to cause it to move to the right, moving the gate valve 32 to the right as shown in the drawing feeding more air to the turbine and increasing the turbine speed, thereby increasing the fuel pressure in the manifold 26.

The piston 114 is controlled by air which is fed to the line 120 of the air turbine air supply 108. The air from line 120 enters a valve chamber 122 from whence it is fed up through either the lines 132 or 134 to either side of the piston, the other side of the piston being vented through the vent lines 136 or 138. Manually operated electrical control means functions in the same manner through the solenoid 164 which is controlled through electrical leads from a control panel by an operator.

The pressure drop across valves No. 2 and No. 3 is controlled by the separate pressure regulator valves 50 and 52. These valves maintain a constant pressure drop across the control valve and also function as shut-off valves to stop the flow through the distributor lines 14 and 16. By venting either of the vent lines 58 or 60, the pistons 54 or 78 in the pressure regulator valves will move the valves 64 and 74 against their seats to closed position. The venting of the lines 58 and 90 is controlled by cylindrical slide valves 96 and 98, the position of which is controlled by a master fulcrum control rod 206.

The position of the fuel regulating valves Nos. 1, 2 and 3 is controlled by signals fed in from the device 25 which is responsive to the flow of air through the compressor, by the manual control 27 by which the operator selects the fuel to air ratio or the desired flight Mach number, and by the pressure ratio sensing device which aids in the determination of the fuel to air ratio. The pressure ratio sensing device and the manual control lever feed in their signal by axially positioning the master fulcrum control rod 206. The axial position of this rod determines the number of combustion zones which will be in operation by operating the shut-off valves 64 and 74 in the distributor lines 14 and 16. The axial position of this master control rod 206 also determines which of the rollers 200, 202 and 204 will act as a fulcrum for the control lever arm 192. The pivotal position of the lever arm is controlled by the bellows 306 which compresses or expands in response to the amount of air flowing through the compressor which determines the volume of air that will flow into the combustion zone in the afterburner.

As the master fulcrum control rod 206 is shifted axially to change the fuel to air ratio, either the fulcrum roller 200 or 202 or 204 will engage the respective point 194 or 196 or 198 on the lever arm 192. Each of the fulcrum rollers will successively change the operating length of the lever arm so as to change the amount and rate of response given to the rocker arm 186 which controls the opening of 184 on the bleeder line 152. The change in fulcrum roller will also laterally shift the position of the lever arm to change the position of the rocker arm and change the amount of fuel which is bled from the bleeder line 156. This bleeder line 156 controls the pressure in the chamber 154 in back of the valve control piston 150 and thus the position of the lever arm 192 controls the position of the flow control valves. The position of the valves is also fed to the lever arm by means of the hollow boss 208, the spring 210 and the plug 216, which bears against the lever arm substantially at its point of contact with the valve controlling rocker arm 186.

Thus it will be seen that I have provided an improved fuel control system for an afterburner which meets the objectives hereinbefore set forth and which operates to give an accurate regulation and control of the flow of fuel to the combustion area. The number of combustion zones used in the afterburner combustion area may be changed at will with the change in fuel to air ratio without affecting the performance of the engine and a smooth transition is obtained without surges or fluctuations in power as the fuel to air ratio is varied over a wide range.

The change in fuel to air ratio automatically controls the number of combustion zones in operation and the number of fuel regulator valves in operation and the mechanism is operable from a single operating mechanism which combines the various control signals. The number of combustion zones can be selected with the use of a single pressurized fuel supply. Further, the pressure of the incoming fuel and the pressure drop across the control valves are automatically controlled without affecting the performance of the machine or without necessitating a time delay or inconvenience utilizing the operating mechanism which selects the fuel to air ratio desired.

The mechanism is rugged and durable and will operate without the need of fine adjustment and is well adapted to use in a turbo-jet type of engine.

I have, in the drawing and specification presented a detailed disclosure of the preferred embodiments of my invention, but it is to be understood that I do not intend to limit the invention to the specific form disclosed but intend to cover all modifications, changes and alternative constructions and methods falling within the scope of the principles taught by my invention.

I claim as my invention:

1. A fuel flow control system comprising a pressurized source of fuel, a plurality of fuel flow control valves having their inlets connected in parallel to said fuel source, individual distributor lines connected to the outlets of the individual valves and leading to combustion zones, control means for said valves mechanically interconnecting the valves and moving them in unison to adjust the flow of fuel through each of the valves, individual shut-off valves in selected individual distributor lines, means for individually operating the shut-off valves to determine the number of distributor lines supplying fuel to the combustion zones, a lever connected to the flow control valve control means to control the position of the valves, condition-responsive means connected to the lever to cause pivotal movement thereof to control the position of the flow control valves in response to a change in condition, and a movable fulcrum for the lever operative to change the amount and rate of response of the valves with the change in said condition, said movable fulcrum being operatively connected to the shut-off valve operating means to thereby simultaneously change the flow control valve position in accordance with the number of distributor lines that are operative as determined by the position of said shut-off valves.

2. A fuel flow control system comprising a plurality of fuel flow control valves arranged in parallel as to fuel flow being mechanically interconnected for movement in unison between an open and a closed position, a pressurized source of fuel connected to the inlet side of the flow control valves, individual distributor lines connected to the outlet side of said flow control valves, shut-off valves in certain of the distributor lines adapted to stop the flow of fuel through said lines, a lever arm operatively connected to the fuel flow valves to control the position thereof, condition-responsive means connected to the lever arm to control the flow of fuel by regulating the position of the lever arm and flow control valves in response to a condition change relating to fuel flow regulation, and main control means operatively connected to the shut-off valves to individually close the valves and connected to the lever arm and operative to change the effective length of the lever arm in accordance with the closing of the individual shut-off valves to thereby change the positional response of the flow control valves with respect to the condition-responsive means as the number of open distributor lines changes.

3. A mechanism for controlling the flow of fluid fuel comprising a plurality of flow control valves arranged in parallel as to fluid flow mechanically interconnected to move in unison, a source of fuel supply connected to the inlet side of the valves, a plurality of distributor lines connected to the outlet side of the valves and leading to a combustion zone, shut-off valves in certain of the distributor lines, a positional control for the fuel control valves including a pivotal lever arm, the position of one portion of the lever arm controlling the position of the fuel control valves, means for delivering air to the combustion zone, means responsive to the quantity of air passing to the combustion zone and connected to the lever arm to control the position of the valves in accordance with the amount of air fed to the combustion zone, and main control means individually operating the shut-off valves and connected to the lever arm to change its position with closing of the individual shut-off valves to thereby change the position of the flow control valves with the shutting off of the individual shut-off valves.

4. A fuel flow control system comprising a pressurized source of fuel, a plurality of fuel flow control valves arranged in parallel as to fuel flow having their inlet sides connected to the source of fuel, individual distributor lines leading between the individual valves and a combustion zone, shut-off valves in certain of the individual distributor lines and adapted to be operated individually to close off certain of the distributor lines, valve position control means operatively connected to the fuel flow control valves and including a pivotal operating lever means for delivering a flow of air to the combustion zone, means responsive to the amount of air flowing into the combustion zone and connected to said operating lever to control the position of the fuel valves in accordance with the air flow, raised fulcrum points on the lever adapted to supply movable pivotal points for the operation of the lever, said fulcrum points being of different elevations to change the position of the fuel flow valves and being in different locations to change the amount and rate of response of the fuel flow valves as controlled by the air flow responsive means, and a movable support adapted to individually contact said fulcrum points to vary the position and pivotal point of the lever, and a main control means connected to said movable support and connected to said shut-off valves to change the pivotal position of the lever with change in the number of distributor lines that are closed.

5. A fuel flow control system comprising a pressurized fuel inlet line, a plurality of fuel valves communicating on their inlet side with said fuel line inlet and arranged in parallel as to fuel flow, a plurality of separate fuel supply lines for leading to a fuel burner and connected to the outlet side of said fuel valves, separate shut-off valves located in at least some of the fuel supply lines and being individually controllable to close the valves to stop the flow of fuel in the individual lines, first means for separately closing the shut-off valves, and second means controlling the position of the fuel valves, said first and second means interconnected for substantially simultaneous operation with said second means increasing the opening of said fuel valves in the lines having shut-off valves remaining open as the individual shut-off valves are closed to compensate for the reduction in number of lines supplying fuel so that a uniform rate of change of fuel flow is maintained.

6. A system for regulating the flow of fuel comprising a plurality of flow control valves, a pressurized fuel line communicating with the inlet side of said flow control valves, a plurality of separate outlet lines for leading to combustion zones from individual control valves, separate shut-off valves in a number of said outlet lines to individually control the flow in said lines, first means operatively connected to the shut-off valves to selectively open said valves, and second means connected to control the opening of said flow control valves, said first and second means interconnected to cause said second means simultaneously to decrease the total opening of the flow control valves in lines having open shut-off valves as one of the shut-off valves is opened so that a smooth rate of change of flow of fuel will be obtained.

7. A fuel control mechanism for supplying fuel to a combustion area comprising a pressurized source of fuel, a plurality of rigidly interconnected individual fuel flow control first valves arranged in parallel as to fuel flow and connected to said pressurized source of fuel, individual distributor lines leading from the discharge side of said individual fuel flow valves to a combustion zone, means for controlling the position of said fuel flow valves, individual shut-off and pressure regulating second valves in the distributor lines, means for individually closing said second valves to shut-off individual distributor lines, and means responsive to pressure differential across individual first valves connected to operate said closing means for said second valves.

References Cited in the file of this patent
UNITED STATES PATENTS

| | | |
|---|---|---|
| 2,127,172 | Hermitte | Aug. 16, 1938 |
| 2,503,048 | Ifield | Apr. 4, 1950 |
| 2,644,513 | Mock | July 7, 1953 |
| 2,668,415 | Lawrence | Feb. 9, 1954 |
| 2,739,442 | Neal et al. | Mar. 27, 1956 |
| 2,750,741 | Leeper | June 19, 1956 |
| 2,871,659 | Chamberlin | Feb. 3, 1959 |

FOREIGN PATENTS

| | | |
|---|---|---|
| 526,869 | Germany | June 11, 1931 |
| 731,524 | Great Britain | June 8, 1955 |

(Corresponding U.S 2,871,659 Feb. 3, 1959)